United States Patent
Mathys

[15] 3,684,336
[45] Aug. 15, 1972

[54] MINIATURE TYPE BALL BEARING

[72] Inventor: Pierre Mathys, rue des Bossons, 78-14, Petit-Lancy, Canton, Switzerland

[22] Filed: March 8, 1971

[21] Appl. No.: 121,759

[30] Foreign Application Priority Data

March 11, 1970 Switzerland............3632/70

[52] U.S. Cl..........................................308/196
[51] Int. Cl...........................................F16c 33/60
[58] Field of Search.............308/196, 191, 190, 193

[56] References Cited

UNITED STATES PATENTS 1,426,236  8/1922  Williams...................308/196

Primary Examiner—Martin P. Schwadron
Assistant Examiner—Frank Susko
Attorney—Stevens, Davis, Miller & Mosher

[57] ABSTRACT

Miniature type ball bearing having a first ball race path allotted on two rings, said rings engaging said balls by means of edges located on said rings, said edges forming said first ball race path, a second ball race path being formed of two edges located on a third ring of an embodiment, said bearing being produced without clearance or squeezing, said bearing being submitted to a polishing operation for adjusting clearance, with advantages resulting mainly in the economical and accurate production of miniature type ball bearings.

7 Claims, 4 Drawing Figures

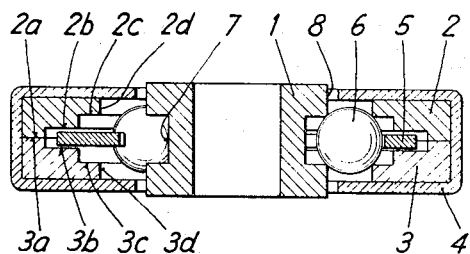
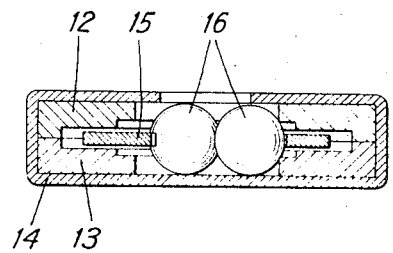
FIG.1  FIG.3
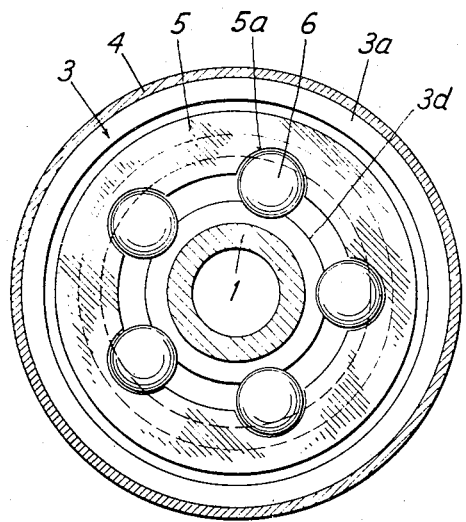
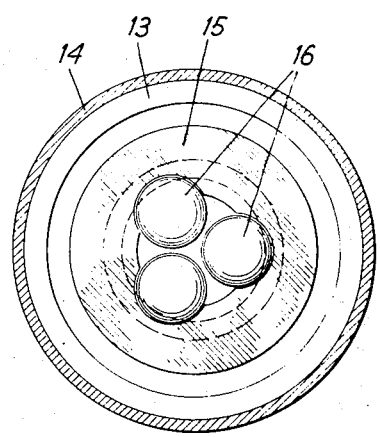
FIG.2  FIG.4

MINIATURE TYPE BALL BEARING

BACKGROUND OF THE INVENTION

1. Field of the invention

This invention relates to miniature type ball bearings and to methods for manufacturing such bearings.

The expression "miniature type ball bearings" comprises bearings having balls the diameter of which balls is smaller than 1 mm.

2. Description of the prior art

In prior art miniature type ball bearings two rings maintaining the balls in a predetermined axial position engage said balls by means of small truncated cone shaped surfaces disposed at an angle of 45° relative to the axis of the bearing. Such prior art bearings generally comprise a third ring, in which a groove is cut, said groove having an isosceles trapezoidal shaped section, the two sides of which are inclined at an angle of 45° relative to the basis. Small truncated cone shaped surfaces of this groove form a second ball race path which may be an inner or an outer ball race path. For maintaining or retaining said two rings in a proper axial position relative to each other, a portion of one of said two rings is forced or driven into an associated portion of the other ring.

Though such prior art bearings are useful, their manufacturing presents several inconveniences or drawbacks. At first, the machining of the small tapered surfaces forming the ball race paths is most fastidious. It is indeed very difficult to obtain such small surfaces having satisfactory surface characteristics. Moreover, if two small tapered surfaces forming the same ball race path do not have the same inclination relative to the axis of the bearing or if the angle of two small tapered surfaces forming one ball race path differs from the angle of the small tapered surfaces forming the other ball race path, said balls contact or engage the small tapered surfaces along circles having different diameters, so that on at least one of the small tapered surfaces rolling movememt is accompanied by sliding movement causing abnormal wear of the small tapered surfaces and making the bearing defective. Finally, assembling the bearing also presents difficult problems concerning or relating in particular to the clearance of the ball set of the bearing. Ball clearance is generally provided by driving or pressing said two rings holding the balls in one another, which driving or pressing operation requires greatest care and accuracy. In particular, if the driven ring is pushed too far, the balls are blocked and the bearing is generally lost, because it is not possible to draw back said ring without destroying it. For carrying out the assembly of the bearing in large series without too much waste or scrap, the rings forming the bearings have to be machined to very costly extremely accurate dimensions figures with the manufacturing conditions becoming such, that highly specialized and skilled workers have to be employed for obtaining a satisfactory production at a rather high cost.

SUMMARY OF THE INVENTION

Accordingly it is a primary object of the present invention to provide a new miniature type ball bearing which can be produced under easier conditions.

Another object of the present invention is to provide a miniature type ball bearing, having a first ball race path allotted on two rings, each of said rings having an abutment surface perpendicular to the longitudinal axis of the bearing, said abutment surfaces of said two rings abutting against each other, said ring engaging said balls by means of an edge located at the intersection of a cylindrical surface and of a plane surface at a predetermined distance from said abutment surface, said cylindrical surfaces of said two rings having the same diameter.

A further object of the present invention is to provide a miniature type ball bearing having a second ball race path formed of two edges located on a third ring, said edges being made up of a groove cut in a cylindrical surface of said third ring, the distance between said two edges of said second ball race path being equal to the distance between said two edges of said first ball race path.

Still another object of the present invention is to provide a miniature type ball bearing in which said two rings carrying said first ball race path have the same diameter.

A further object of the present invention is to provide a miniature type ball bearing the balls of which are disposed for directly engaging a tapered end of an arbor supported by said bearing.

A still further object of the present invention is to provide a method for manufacturing a miniature type ball bearing comprising the steps of producing said three rings by turning said rings, said edges forming said ball race path having nominal dimension figures for holding said balls without clearance and without squeezing, and then submitting said rings to a polishing operation.

Still another object of the present invention is to provide a method for manufacturing a miniature type ball bearing comprising the steps of assembling said bearing after completion of the turning of said rings, progressively axially pressing said two rings carrying said first ball race path and driving said balls by means of said third ring simultaneously with the axial pressing of said two rings carrying said first ball race path, whereby to polish said ball race path by means of the action of said ball on said ball race path, and then securing said rings of said first ball race path to each other.

Various other more detailed objects and advantages of the invention such as arise in connection with carrying out the invention in practical embodiments, will be in part obvious and in part hereinafter stated as the description of the invention proceeds.

BRIEF DESCRIPTION OF THE DRAWINGS

For a full and more complete understanding of the invention reference may be had to the following description and accompanying drawings wherein:

FIG. 1 is an axial sectional view of a miniature type ball bearing, said bearing being a first embodiment of the bearing of the invention;

FIG. 2 is a partial sectional view in elevation of the miniature type ball bearing of FIG. 1, a part of the bearing being removed;

FIG. 3 is an axial sectional view of another miniature type ball bearing, said bearing being a second embodiment of the bearing of the invention; and FIG. 4 is a partial sectional view in elevation of the miniature type ball bearing of FIG. 3, a part of the bearing being removed.

DESCRIPTION OF THE PREFERRED EMBODIMENTS

In FIG. 1 groove 7 of rectangular section is cut in cylindrical outer surface 8 of ring 1. Rings 2 and 3 each comprise abutment surfaces 2a, 3a, plane surfaces 2b, 2c and 3b, 3c and cylindrical surfaces 2d, 3d. Surfaces 2a, 2b, 2c and 3a, 3b, 3c extend in a direction perpendicular to the longitudinal axis of the bearing. Surfaces 2d and 3d have the same diameter. FIG. 1 shows shell or envelope 4 maintaining abutment surfaces 2a, 3a of rings 2, 3 in abutting engagement. Plane surfaces 2c and 3c are machined for causing the distances between said plane surfaces 2c and 3c and said abutment surfaces 2a, 3a, respectively, to be such, that the distance between said plane surface 2c and 3c be equal to the width of rectangular groove 7.

Four edges located at the intersection of surfaces 2c and 2d of ring 2, at the intersection of surfaces 3c and 3d of ring 3 and at the intersection of plane lateral surfaces of rectangular groove 7 with cylindrical outer surface 8 of ring 1 form the inner and the outer ball race ways or paths of the bearing.

Selection of the width of rectangular groove 7 and of the distance between surfaces 2c and 3c is dependent on the diameter of balls 6 and is made for causing balls 6 to engage rings 1, 2 and 3 along 45° parallels of ball 6 (i.e., diameters at 45° to the axis of the bearing), the action of ball 6 on the edges forming the ball race ways or paths being directed in accordance with or according to the angle bisector or bisector of the dihedral forming the respective edge.

For maintaining balls 6 at equal distances from one another, ball race or cage 5 comprises notches 5a, surfaces 2b and 3b maintaining ball race or cage 5 at least approximately or roughly in the equatorial plane of balls 6.

For ensuring extremely accurate form and location or position of the ball race ways or paths of the bearing it is sufficient to machine every one of rings 1, 2, and 3 to only two accurate dimension figures each. The dimension figures to be accurately machined are those of cylindrical outer surface 8 and the width of groove 7 for ball bearing ring 1, those of cylindrical surface 2d and the distance between plane surface 2c and abutment face 2a for ring 2 and those of cylindrical surface 3d and the distance between plane face 3c and abutment surface 3a for ring 3. Rings 1, 2, and 3 can thus be produced very easely, e.g. by turning on an automatic lathe. Rings 2 and 3 have the same section and are indeed machined halves of one single initial ring. Rings 1, 2, and 3 of the present ball bearing may thus be machined with only two sets of cams or cam discs.

Envelope or shell 4 can be formed of a tubular element which may be folded upon rings 2, 3 when assembling the ball bearing. The two outer borders of envelope or shell 4 being long enough for reaching inwards beyond rings 2 and 3, so that they will prevent penetration of impurities in the miniature type ball bearing.

For causing balls 6 to have a desired clearance, ball race way or path forming edges of rings 1, 2, and 3 may be machined to nominal dimension figures allowing balls 6 to be held by said edges without clearance and without squeezing. Then rings 1, 2, 3 undergo a polishing operation consisting of passing said rings for a while in a polishing drum or barrel into a mixture of discrete particles having diameters smaller than the diameters of the openings of the rings, whereby said discrete particles enter in said ring openings and contact said edges forming said ball race ways or paths, said edges forming said ball race ways or paths. A tapered punching or stamping tool having an apex or aperture angle of 90° may be pressed on said edges. By coating said tapered punching or stamping tool with molybdenum sulphide powder, a dry working miniature type ball bearing can be obtained. According to a still other method, balls 6 can undergo electrolytic polishing during a predetermined time interval or period, to remove material from said edges forming said ball race ways or paths for conferring or giving said desired clearance to said balls 6.

According to another method, assembling the miniature type ball bearing may occur upon turning rings 1, 2, and 3. Rings 2 and 3 forming the outer ball race way or path are, while they are mounted in shell or envelope 4, progressively pressed together axially, balls 6 being driven by third ring 1, to polish said edges forming said ball race ways or paths by squeezing the edge material under the action or influence of balls 6 on said edges.

The surfaces, at the intersection of which are located the edges forming the ball race ways or paths of the miniature type ball bearing, are machined or turned with an accuracy of the order of 1 or 2 microns, the desired clearance of said balls 6 being of the order of one hundredth mm. The desired clearance to said balls 6 may be achieved by polishing independently of machining tolerances. The miniature type ball bearing of FIGS. 1 and 2 may be used as bearings for an arbor or shaft, ring 1 being mounted on said shaft and envelope or shell 4 being held in a housing. The miniature type ball bearing may also be used for pivotally mounting an element for rotation on a pin. In this case envelope or shell 4 would be secured to the pivoting element and ring 1 would fixedly engage said pin.

The miniature type ball bearing of FIGS. 3 and 4 is similar to the embodiment of FIGS. 1 and 2 and comprises rings 12, 13 similar to rings 2 and 3 of the first embodiment, rings 12 and 13 being held in abutment against each other by means of envelope or shell 14 surrounding ball race or cage 15, balls 6 being, however, free; balls 6 are disposed for receiving, e.g. a tapered pivot of a mobile member of a measuring instrument.

The described bearings may have extremely reduced dimensions. When using the smallest commercially available balls 6, said balls having a diameter of 0.25 mm, a corresponding miniature type ball bearing according to FIGS. 1 and 2 may be manufactured with an outer diameter of about 2 mm.

What is claimed is:

1. A miniature type ball bearing, comprising a first ball race path comprising two rings, each of said rings having an abutment surface perpendicular to the axis of the bearing, said abutment surfaces of said two rings abutting against each other, each of said rings engaging bearing balls by means of a circular race edge located at the intersection of a cylindrical surface and of a plane surface at a predetermined distance from said abutment surface, said cylindrical surfaces of said two rings having the same diameter, a second ball race path comprising two circular race edges located on a third ring, said edges formed by a groove cut in a cylindrical surface of said third ring, the distance between said two race edges of said second ball race path being equal to the distance between said two race edges of said first ball race path.

2. A miniature type ball bearing according to claim 1, in which said two rings comprising said first ball race path have the same diameter.

3. Miniature type ball bearing, having a first ball race path allotted on two rings, each of said rings having an abutment surface perpendicular to the longitudinal axis of the bearing, said abutment surfaces of said two ring abutting against each other, said rings engaging said balls by means of an edge located at the intersection of a cylindrical surface and of a plane surface at a predetermined distance from said abutment surface, said cylindrical surfaces of said two rings having the same diameter, said balls being disposed for directly engaging a tapered end of an arbor supported by said bearing.

4. A miniature type ball bearing, comprising an exterior ball race path comprising two rings, each of said rings having an abutment surface perpendicular to the axis of the bearing, said abutment surfaces of said two rings abutting against each other, said rings enclosing and each of said rings engaging bearing balls by means of a circular race edge located at the intersection of a cylindrical surface and of a plane surface at a predetermined distance from said abutment surface, said cylindrical surfaces of said two rings having the same diameter.

5. A miniature type ball bearing according to claim 1, wherein said circular race edges are polished edges.

6. A miniature type ball bearing according to claim 1, wherein the cross-sectional shapes, in a plane including the bearing axis, of the two rings comprising the first race path are identical.

7. A miniature type ball bearing according to claim 1, additionally comprising a shell comprising an annular channel everywhere having a U-shaped cross-section on the exterior of the two rings comprising the first race path, connecting said two rings.

* * * * *